(12) United States Patent
Arandorenko et al.

(10) Patent No.: US 11,507,103 B2
(45) Date of Patent: Nov. 22, 2022

(54) METHOD, SYSTEM AND APPARATUS FOR LOCALIZATION-BASED HISTORICAL OBSTACLE HANDLING

(71) Applicant: ZEBRA TECHNOLOGIES CORPORATION, Lincolnshire, IL (US)

(72) Inventors: Peter Arandorenko, Mississauga (CA); Sadegh Tajeddin, Mississauga (CA); Zi Cong Guo, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 154 days.

(21) Appl. No.: 16/703,117

(22) Filed: Dec. 4, 2019

(65) Prior Publication Data

US 2021/0173405 A1 Jun. 10, 2021

(51) Int. Cl.
*G05D 1/02* (2020.01)
*B25J 9/16* (2006.01)

(52) U.S. Cl.
CPC .......... *G05D 1/0238* (2013.01); *B25J 9/1666* (2013.01); *G05D 1/0217* (2013.01); *G05D 1/0253* (2013.01); *G05D 1/0272* (2013.01)

(58) Field of Classification Search
CPC .. G05D 1/0238; G05D 1/0272; G05D 1/0253; G05D 1/0217; G05D 1/0274; G05D 1/0248; G05D 2201/0216; B25J 9/1666; G05B 19/042
See application file for complete search history.

(56) References Cited

U.S. PATENT DOCUMENTS

| 5,209,712 A | 5/1993 | Ferri |
| 5,214,615 A | 5/1993 | Bauer |
| 5,408,322 A | 4/1995 | Hsu et al. |
| 5,414,268 A | 5/1995 | McGee |
| 5,423,617 A | 6/1995 | Marsh et al. |
| 5,534,762 A | 7/1996 | Kim |

(Continued)

FOREIGN PATENT DOCUMENTS

| CA | 2835830 | 11/2012 |
| CA | 3028156 | 1/2018 |

(Continued)

OTHER PUBLICATIONS

Carreira et al., "Enhanced PCA-based localization using depth maps with missing data," IEEE, pp. 1-8, Apr. 24, 2013.

(Continued)

*Primary Examiner* — Ryan Rink
*Assistant Examiner* — Shahzab Hussain Shah

(57) ABSTRACT

A method of obstacle handling for a mobile automation apparatus includes: obtaining an initial localization of the mobile automation apparatus in a frame of reference; detecting an obstacle by one or more sensors disposed on the mobile automation apparatus; generating and storing an initial location of the obstacle in the frame of reference, based on (i) the initial localization, and (ii) a detected position of the obstacle relative to the mobile automation apparatus; obtaining a correction to the initial localization of the mobile automation apparatus; and applying a positional adjustment, based on the correction, to the initial position of the obstacle to generate and store an updated position of the obstacle.

16 Claims, 9 Drawing Sheets

(56) References Cited

U.S. PATENT DOCUMENTS

| | | |
|---|---|---|
| 5,566,280 A | 10/1996 | Fukui et al. |
| 5,704,049 A | 12/1997 | Briechle |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,133,951 B1 | 11/2018 | Mendonca et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 10,429,487 B1 * | 10/2019 | Fowe .................. G01S 5/0284 |
| 11,003,188 B2 * | 5/2021 | Scott .................. G05D 1/0214 |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0128195 A1 | 6/2005 | Houston et al. |

(56) References Cited

U.S. PATENT DOCUMENTS

| | | |
|---|---|---|
| 2005/0174351 A1 | 8/2005 | Chang |
| 2005/0213082 A1 | 9/2005 | DiBernardo et al. |
| 2005/0213109 A1 | 9/2005 | Schell et al. |
| 2005/0237320 A1 | 10/2005 | Itoh et al. |
| 2006/0032915 A1 | 2/2006 | Schwartz |
| 2006/0045325 A1 | 3/2006 | Zavadsky et al. |
| 2006/0064286 A1 | 3/2006 | Fink et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0188759 A1 | 8/2011 | Filimonova et al. |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0278782 A1 | 11/2012 | Pal et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0138534 A1 | 5/2013 | Herwig |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0169681 A1 | 7/2013 | Rasane et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0088761 A1* | 3/2014 | Shamlian ............ G05D 1/0227 700/253 |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0112537 A1 | 4/2014 | Frank et al. |
| 2014/0129027 A1 | 5/2014 | Schnittman |
| 2014/0133740 A1 | 5/2014 | Plagemann et al. |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195095 A1 | 7/2014 | Elbit Systems Ltd |

(56) References Cited

U.S. PATENT DOCUMENTS

| | | |
|---|---|---|
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1* | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0195491 A1 | 7/2015 | Shaburov et al. |
| 2015/0212521 A1 | 7/2015 | Pack et al. |
| 2015/0235157 A1 | 8/2015 | Avegliano et al. |
| 2015/0243073 A1 | 8/2015 | Chen et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310348 A1* | 10/2015 | Dessouky ............. G06N 7/005 706/52 |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1 | 12/2015 | Brazeau et al. |
| 2015/0355639 A1 | 12/2015 | Versteeg et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1 | 9/2016 | High et al. |
| 2016/0260051 A1 | 9/2016 | Wu et al. |
| 2016/0260054 A1 | 9/2016 | High et al. |
| 2016/0271795 A1 | 9/2016 | Vicenti |
| 2016/0290805 A1 | 10/2016 | Irish et al. |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0030538 A1 | 2/2017 | Geisler et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1 | 3/2017 | Solar et al. |
| 2017/0084037 A1 | 3/2017 | Barajas Hernandez et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1 | 6/2017 | Gornish |
| 2017/0178301 A1 | 6/2017 | Moraleda et al. |
| 2017/0178310 A1 | 6/2017 | Gornish |
| 2017/0193434 A1 | 7/2017 | Shah et al. |
| 2017/0205892 A1 | 7/2017 | Petrovskaya et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0297478 A1 | 10/2017 | Sherman et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1 | 5/2018 | Douglas et al. |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |
| 2018/0201423 A1 | 7/2018 | Drzewiecki et al. |
| 2018/0204111 A1 | 7/2018 | Zadeh et al. |
| 2018/0218218 A1 | 8/2018 | Madan et al. |
| 2018/0251253 A1 | 9/2018 | Taira et al. |
| 2018/0276596 A1 | 9/2018 | Murthy et al. |
| 2018/0281191 A1 | 10/2018 | Sinyayskiy et al. |
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |

(56) References Cited

U.S. PATENT DOCUMENTS

| | | | |
|---|---|---|---|
| 2018/0370727 A1 | 12/2018 | Hance et al. | |
| 2019/0025838 A1 | 1/2019 | Artes et al. | |
| 2019/0034854 A1 | 1/2019 | Borodow et al. | |
| 2019/0049962 A1 | 2/2019 | Ouellette et al. | |
| 2019/0057588 A1 | 2/2019 | Savvides et al. | |
| 2019/0065861 A1 | 2/2019 | Savvides et al. | |
| 2019/0073554 A1 | 3/2019 | Rzeszutek | |
| 2019/0073559 A1 | 3/2019 | Rzeszutek et al. | |
| 2019/0073627 A1 | 3/2019 | Nakdimon et al. | |
| 2019/0077015 A1 | 3/2019 | Shibasaki et al. | |
| 2019/0087663 A1 | 3/2019 | Yamazaki et al. | |
| 2019/0094876 A1 | 3/2019 | Moore et al. | |
| 2019/0108606 A1 | 4/2019 | Komiyama | |
| 2019/0108678 A1 | 4/2019 | Hazeghi et al. | |
| 2019/0160675 A1 | 5/2019 | Paschal, II et al. | |
| 2019/0178436 A1 | 6/2019 | Mao et al. | |
| 2019/0180150 A1 | 6/2019 | Taylor et al. | |
| 2019/0197439 A1 | 6/2019 | Wang | |
| 2019/0197728 A1 | 6/2019 | Yamao | |
| 2019/0236530 A1 | 8/2019 | Cantrell et al. | |
| 2019/0271984 A1 | 9/2019 | Kingsford | |
| 2019/0304132 A1 | 10/2019 | Yoda et al. | |
| 2019/0392212 A1 | 12/2019 | Sawhney et al. | |
| 2020/0049511 A1 | 2/2020 | Sithiravel et al. | |
| 2020/0053325 A1 | 2/2020 | Deyle et al. | |
| 2020/0068126 A1 | 2/2020 | Fink et al. | |
| 2020/0111267 A1 | 4/2020 | Stauber et al. | |
| 2020/0118064 A1 | 4/2020 | Perrella et al. | |
| 2020/0150655 A1* | 5/2020 | Artes | G05D 1/0214 |
| 2020/0192388 A1 | 6/2020 | Zhang et al. | |
| 2020/0314333 A1 | 10/2020 | Liang et al. | |
| 2020/0341151 A1 | 10/2020 | Yoshida | |
| 2020/0410766 A1 | 12/2020 | Swaminathan | |
| 2021/0019939 A1 | 1/2021 | Hu et al. | |
| 2021/0163068 A1* | 6/2021 | Zhu | B62D 15/0285 |
| 2021/0233305 A1 | 7/2021 | Garcia et al. | |
| 2021/0271238 A1* | 9/2021 | Ko | G01S 3/043 |

FOREIGN PATENT DOCUMENTS

| | | |
|---|---|---|
| CN | 102214343 | 10/2011 |
| CN | 104200086 | 12/2014 |
| CN | 105989512 | 10/2016 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| EP | 3400113 | 11/2018 |
| FR | 3001567 | 8/2014 |
| GB | 2323238 | 9/1998 |
| GB | 2330265 | 4/1999 |
| JP | 2014170431 | 9/2014 |
| JP | 2016194834 | 11/2016 |
| JP | 2017016539 | 1/2017 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2017175312 | 10/2017 |
| WO | WO 2017187106 | 11/2017 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

Castorena et al., "Autocalibration of lidar and optical cameras via edge alignment", 2016 IEEE International Conference on Acoustics, Speech and Signal Processing (Mar. 20. 2016).

Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.

Clark, "Casino to open world's first NFC-enabled supermarket", (Aug. 19, 2018), pp. 1-7.

Clark, "Jogtek launches passive NFC shelf-edge labels", (Sep. 19, 2018), pp. 1-6.

Cleveland Jonas et al.: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France, [hal-01097361].

Douillard, Bertrand, et al. "On the segmentation of 3D Lidar point clouds." Robotics and Automation (ICRA), 2011 IEEE International Conference on IEEE, 2011.

Dubois, M., et al., 'A comparison of geometric and energy-based point cloud semantic segmentation methods, European Conference on Mobile Robots (ECMR), p. 88-93, Sep. 25-27, 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Federico Tombari et al. "Multimodal cue integration through Hypotheses Verification for RGB-D object recognition and 6DOF pose estimation", IEEE International Conference on Robotics and Automation, Jan. 2013.

Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).

Glassner, "Space Subdivision for Fast Ray Tracing." IEEE Computer Graphics and Applications, 4.10, pp. 15-24, 1984.

Golovinskiy, Aleksey, et al. "Min-Cut based segmentation of point clouds." Computer Vision Workshops (ICCV Workshops), 2009 IEEE 12th International Conference on. IEEE, 2009.

Hackel et al., "Contour Detection in unstructured 3D point clouds,"IEEE, 2016 Conference on Computer vision and Pattern recognition (CVPR), Jun. 27-30, 2016, pp. 1-9.

Hao et al., "Structure-based object detection from scene point clouds," Science Direct, V191, pp. 148-160 (2016).

Hu et al., "An improved method of discrete point cloud filtering based on complex environment," International Journal of Applied Mathematics and Statistics, v48, i18 (2013).

International Search Report and Written Opinion for International Patent Application No. PCT/US2013/070996 dated Apr. 2, 2014.

(56) References Cited

OTHER PUBLICATIONS

International Search Report and Written Opinion for International Patent Application No. PCT/US2013/053212 dated Dec. 1, 2014.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/CN2017/083143 dated Feb. 11, 2018.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion for International Patent Application No. PCT/US2018/030363 dated Jul. 9, 2018.
International Search Report and Written Opinion for International Application No. PCT/US2019/025859 dated Jul. 3, 2019.
International Search Report and Written Opinion from International Patent Application No. PCT/US2019/025849 dated Jul. 9, 2019.
International Search Report and Written Opinion from International Patent Application No. PCT/US2019/049761 dated Nov. 15, 2019.
International Search Report and Written Opinion from International Patent Application No. PCT/US2019/051312 dated Nov. 15, 2019.
International Search Report and Written Opinion from International Patent Application No. PCT/US2019/054103 dated Jan. 6, 2020.
International Search Report and Written Opinion for International Patent Application No. PCT/US2019/057007 dated Jan. 14, 2020.
International Search Report and Written Opinion from International Patent Application No. PCT/US2019/064020 dated Feb. 19, 2020.
International Search Report and Written Opinion for International Patent Application No. PCT/US2020/027948 dated Jul. 16, 2020.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
International Search Report and Written Opinion for International Patent Application No. PCT/US2021/024805 dated Aug. 2, 2021.
International Search Report and Written Opinion for International Patent Application No. PCT/US2021/057388 dated Feb. 2, 2022.
International Search Report and Written Opinion for International Patent Application No. PCT/IB2021/060948 dated Feb. 4, 2022.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (Icip), IEEE, (Oct. 27, 2014), pp. 1575-1578.
Kaikai Liu et al., "Enabling Context-Aware Indoor Augmented Reality via Smartphone Sensing and Vision Tracking", ACM Transactions on Multimedia Computing Communications and Applications, Association for Computer Machinery, US, vol. 12, No.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al.: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009):933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Meyersohn, "Walmart turns to robots and apps in stores", https://www.cnn.com/2018/12/07/business/walmart-robot-janitors-dotcom-store/index.html, Oct. 29, 2019.
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., et al. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, p. 176-.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2nl0, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks,"in IEEE Workshop on Applications of computer vision (WACV), Jan. 2011.

(56) References Cited

OTHER PUBLICATIONS

Rusu, et al. "How to incrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].
Rusu, et al. "Towards 3D Point cloud based object maps for household environments," Science Direct, vol. 56, issue 11, pp. 927-947 [http://www.sciencedirect.com/science/article/pii/S0921889008001140], Nov. 30, 2008. Retrieved from the internet on Jun. 15, 2022.
Schnabel et al. "Efficient RANSAC for Point-Cloud Shape Detection", vol. 0, No. 0, pp. 1-12 (1981).
Senthilkumaran, et al., "Edge Detection Techniques for Image Segmentation-A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=repl&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
Zhang et al., "Mobile computing and industrial augmented reality for real-time data access", Emerging Technologies and Factory Automation, 2001, 8th IEEE International Conference on Oct. 15-18, 2001, pp. 583-588, vol. 2.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Boden, "French retail chain to roll out NFC shelf edge labels to six hypermarkets" (Sep. 19, 2018), pp. 1-7.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Faade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.

\* cited by examiner

US 11,507,103 B2

METHOD, SYSTEM AND APPARATUS FOR LOCALIZATION-BASED HISTORICAL OBSTACLE HANDLING

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

A mobile automation apparatus may be employed to perform tasks within a facility, such as capturing data for use in identifying products that are out of stock, incorrectly located, and the like. The mobile automation apparatus may detect obstacles in the facility, and a navigational path may be generated, based in part on such obstacles, for the mobile automation apparatus to travel within the facility. Corrections to a localization of the mobile automation apparatus may cause navigational errors and reduce system efficiency.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
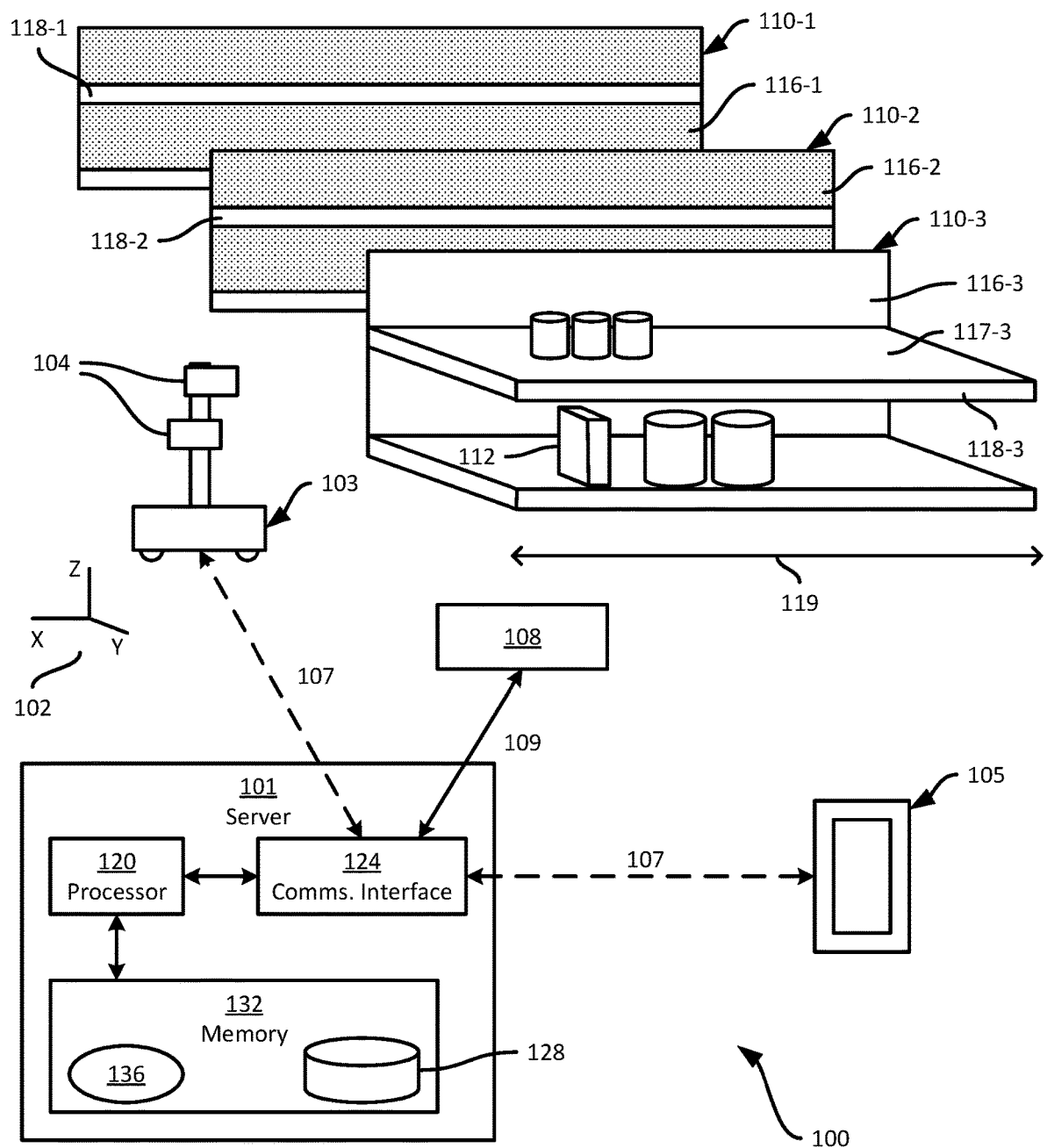
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of obstacle handling for a mobile automation apparatus including: obtaining an initial localization of the mobile automation apparatus in a frame of reference; detecting an obstacle by one or more sensors disposed on the mobile automation apparatus; generating and storing an initial location of the obstacle in the frame of reference, based on (i) the initial localization, and (ii) a detected position of the obstacle relative to the mobile automation apparatus; obtaining a correction to the initial localization of the mobile automation apparatus; and applying a positional adjustment, based on the correction, to the initial position of the obstacle to generate and store an updated position of the obstacle.

Additional examples disclosed herein are directed to a mobile automation apparatus, comprising: a memory; at least one navigational sensor; and a navigational controller connected to the memory and the at least one navigational sensor, the navigational controller configured to: obtain an initial localization of the mobile automation apparatus in a frame of reference; detect an obstacle via the at least one navigational sensor; generate and store, in the memory, an initial location of the obstacle in the frame of reference, based on (i) the initial localization, and (ii) a detected position of the obstacle relative to the mobile automation apparatus; obtain a correction to the initial localization; and apply a positional adjustment, based on the correction, to the initial position of the obstacle to generate and store an updated position of the obstacle.

Further examples disclosed herein are directed to a non-transitory computer readable medium storing computer readable instructions for execution by a navigational controller to: obtain an initial localization of a mobile automation apparatus in a frame of reference; detect an obstacle via at least one navigational sensor disposed on the mobile automation apparatus; generate and store an initial location of the obstacle in the frame of reference, based on (i) the initial localization, and (ii) a detected position of the obstacle relative to the mobile automation apparatus; obtain a correction to the initial localization; and apply a positional adjustment, based on the correction, to the initial position of the obstacle to generate and store an updated position of the obstacle.

FIG. 1 depicts a mobile automation system 100 in accordance with the teachings of this disclosure. The system 100 is illustrated as being deployed in a retail facility, but in other embodiments can be deployed in a variety of other environments, including warehouse facilities, hospitals, and the like. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail facility by one or more access points (not shown). In other examples, the server 101, the client device 105, or both, are located outside the retail facility, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The retail facility in which the system 100 is deployed in the illustrated example includes a plurality of support structures such as shelf modules 110-1, 110-2, 110-3 and so on (collectively referred to as shelf modules 110, and generically referred to as a shelf module 110—this nomenclature may also be employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. Various other support structures can also be included in the retail facility (e.g. peg boards), or in other environments in which the system 100 is deployed.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail facility, and communicates with the server 101 (e.g. via the link 107) to navigate, autonomously or partially autonomously, along a length 119 of at least a portion of the shelf modules 110. As will be described in greater detail below, the apparatus 103 is configured to navigate among the shelf modules 110 and other fixed (i.e. static) structural features of the facility, such as walls, pillars and the like. The apparatus 103 is also configured to navigate among transient obstacles such as customers, shopping carts and other objects, which may be detected dynamically. Navigational functions can be performed by the apparatus 103 and/or the server 101 with regard to a common frame of reference 102 previously established in the facility.

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 for navigational functions, including tracking of the location of the apparatus 103 relative to the frame of reference 102, detection of the above-mentioned transient obstacles, and the like. The apparatus 103 can also employ the sensors to capture shelf data (e.g. images and depth measurements depicting the products 112) during such navigation.

The server 101 includes a special purpose controller, such as a processor 120, specifically designed to control and/or assist the mobile automation apparatus 103 to navigate the environment and to capture data. The processor 120 can be further configured to obtain the captured data via a communications interface 124 for storage in a repository 128 and subsequent processing (e.g. to detect objects such as shelved products 112 in the captured data, and detect status information corresponding to the objects). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The above-mentioned communications interface 124 of the server 101 is interconnected with the processor 120, and includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The processor 120 is interconnected with a non-transitory computer readable storage medium, such as a memory 132, storing the above-mentioned repository 128 as well as computer readable instructions executable by the processor 120 for performing various functionality. Examples of such functionality include control of the apparatus 103 to capture shelf data, post-processing of the shelf data, and generating and providing certain navigational data to the apparatus 103, such as target locations at which to capture shelf data. The memory 132 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 132 each comprise one or more integrated circuits. In some embodiments, the processor 120 is implemented as one or more central processing units (CPUs) and/or graphics processing units (GPUs).

The computer readable instructions stored by the memory 132 can include at least one application executable by the processor 120. Execution of the above-mentioned instructions by the processor 120 configures the server 101 to perform various actions discussed herein. The applications stored in the memory 132 in the illustrated example include a control application 136, which may also be implemented as a suite of logically distinct applications. In general, via execution of the application 136 or subcomponents thereof and in conjunction with the other components of the server 101, the processor 120 is configured to implement various functionality related to controlling the apparatus 103 to navigate among the shelf modules 110 and capture data.

Figure 2:
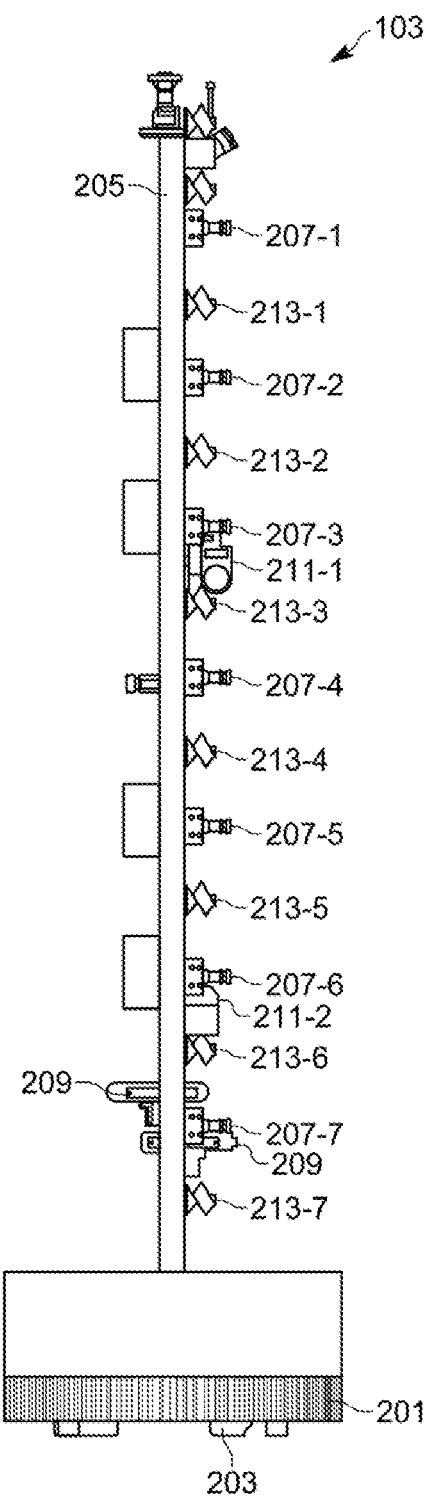
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive mechanism 203 (e.g. one or more electrical motors driving wheels, tracks or the like). The locomotive mechanism 203 can include one or more odometry sensors (e.g. wheel speed sensors) to generate odometry data when the apparatus 103 is in motion. The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf module 110 along the length 119 of which the apparatus 103 is travelling. The apparatus 103 is configured to track a location (e.g. a location of the center of the chassis 201) and orientation of the apparatus 103 in the common frame of reference 102, permitting data captured by the mobile automation apparatus 103 to be registered to the common frame of reference 102. The above-mentioned location and orientation of the apparatus 103 within the frame of reference 102, also referred to as a localization, can be employed in the generation of paths for execution by the apparatus 103.

Figure 3:
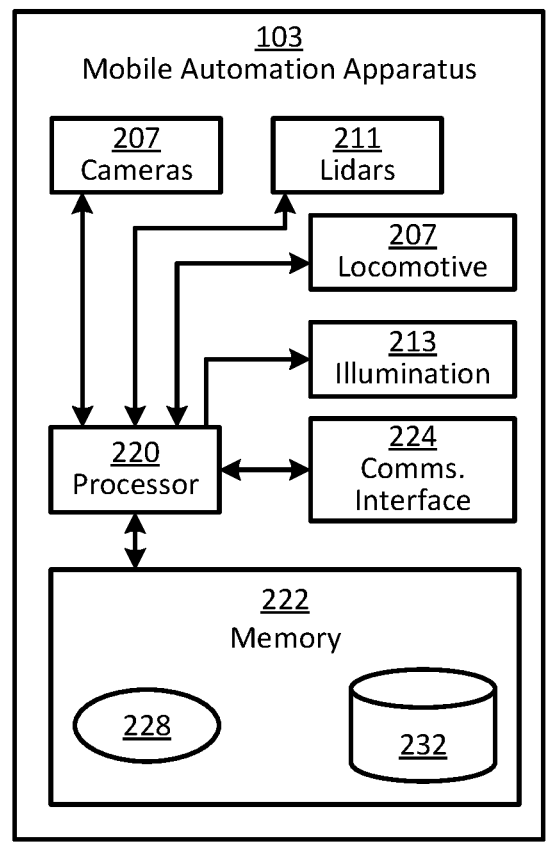
FIG. 3 is a block diagram of certain internal hardware components of the mobile automation apparatus in the system of FIG. 1.

Turning to FIG. 3, certain internal components of the mobile automation apparatus 103 are shown. In particular, apparatus 103 includes a special-purpose navigational controller, such as a processor 220 interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a navigation application 228 which, when executed by the processor 220, configures the processor 220 to perform various functions discussed below in greater detail and related to the navigation of the apparatus 103 (e.g. by controlling the locomotive mechanism 203). The application 228 may also be implemented as a suite of distinct applications in other examples.

The processor 220, when so configured by the execution of the application 228, may also be referred to as a navigational controller 220. Those skilled in the art will appreciate that the functionality implemented by the processor 220 via the execution of the application 228 may also be implemented by one or more specially designed hardware and firmware components, such as FPGAs, Application-Specific Integrated Circuits (ASICs) and the like in other embodiments.

The memory 222 may also store a repository 232 containing, for example, one or more maps of the environment in which the apparatus 103 operates, for use during the execution of the application 228. The repository 232, in the examples discussed below, contains a facility map, which may also be referred to as a permanent map. The facility map represents the positions of fixed structural features of the facility such as walls, shelf modules 110 and the like, according to the frame of reference 102. The apparatus 103 may communicate with the server 101, for example to receive instructions to navigate to specified locations and initiate data capture operations, via a communications interface 224 over the link 107 shown in FIG. 1. The communications interface 224 also enables the apparatus 103 to communicate with the server 101 via the dock 108 and the link 109.

In the present example, the apparatus 103 is configured (via the execution of the application 228 by the processor 220) to generate navigational paths to travel through the environment, for example to reach goal locations provided by the server 101. The apparatus 103 is also configured to control the locomotive mechanism 203 to travel along the above-mentioned paths. To that end, the apparatus 103 is also configured, as will be discussed below in greater detail, to detect obstacles in the surroundings of the apparatus 103. Such obstacles, referred to earlier as transient obstacles, are distinguished from fixed structural features of the facility in which the apparatus 103 is deployed. The positions of obstacles relative to the frame of reference 102 are stored in the memory 222, e.g. in an obstacle map separate from the facility map, or as transient additions to the facility map itself. As will be discussed in greater detail below, the apparatus 103 is also configured to dynamically update the positions of at least some previously detected obstacles in response to certain changes in localization.

As will be apparent in the discussion below, other examples, some or all of the processing performed by the apparatus 103 may be performed by the server 101, and some or all of the processing performed by the server 101 may be performed by the apparatus 103. That is, although in the illustrated example the application 228 resides in the mobile automation apparatus 103, in other embodiments the actions performed by the apparatus 103 via execution of the application 228 may be performed by the processor 120 of the server 101, either in conjunction with or independently from the processor 220 of the mobile automation apparatus 103. As those of skill in the art will realize, distribution of navigational computations between the server 101 and the mobile automation apparatus 103 may depend upon respective processing speeds of the processors 120 and 220, the quality and bandwidth of the link 107, as well as criticality level of the underlying instruction(s).

Figure 4:
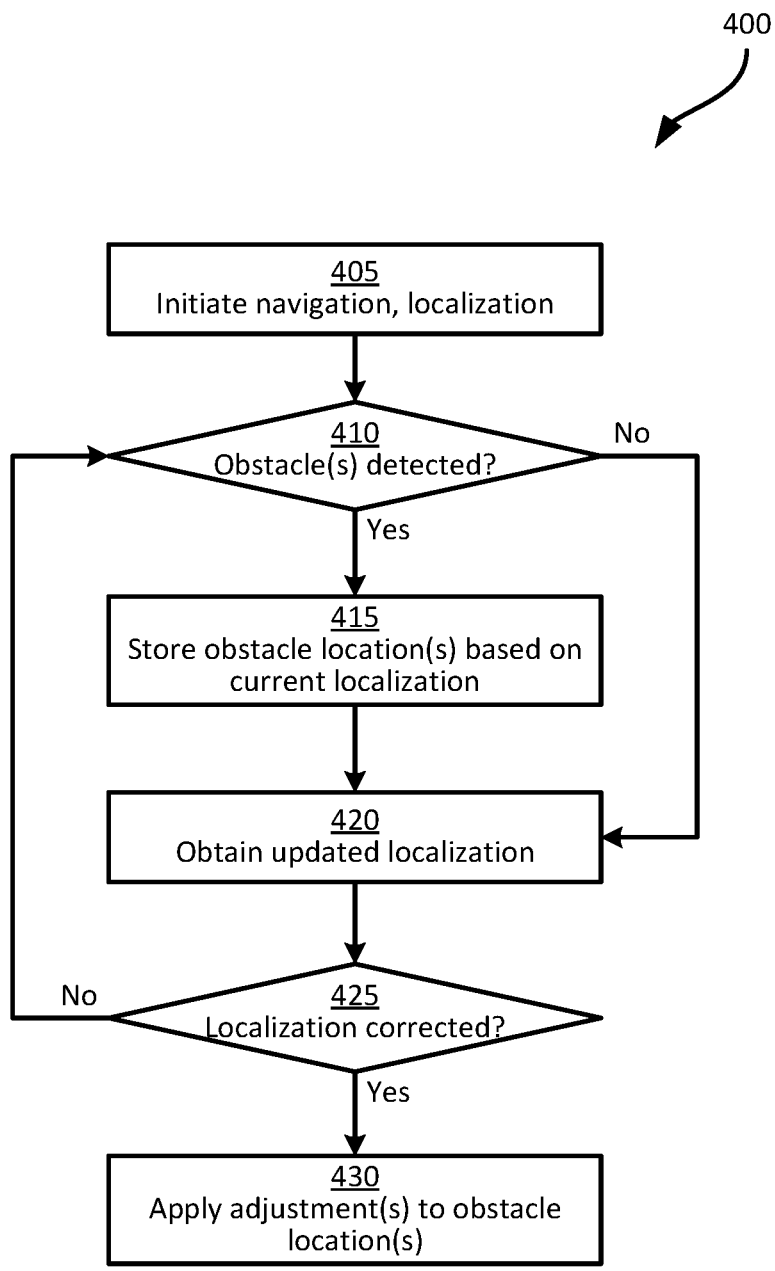
FIG. 4 is a flowchart of a method for obstacle handling at the apparatus of FIG. 1.

The functionality of the application 228 will now be described in greater detail. In particular, the detection and updating of obstacle positions based on localization tracking of the apparatus 103 will be described as performed by the apparatus 103. FIG. 4 illustrates a method 400 of localization-based historical obstacle handling. The method 300 will be described in conjunction with its performance by the apparatus 103.

The apparatus 103 is configured to periodically update its localization according to the frame of reference 102 during navigation within the facility. Localization is updated based on sensor data, e.g. from any one or more of the image, depth and odometry sensors mentioned earlier. In other words, the apparatus 103 detects its location and orientation within the facility by comparing sensor data to the map stored in the repository 232. As will be apparent to those skilled in the art, the accuracy of localization of the apparatus 103 may vary over time. Certain updated localizations may therefore reflect not only physical movement of the apparatus 103, but also corrected localization accuracy.

Obstacles are also detected via the above-mentioned image and depth sensors (e.g. 207, 209, 211), and positions of the obstacles in the frame of reference 102 are stored, e.g. in the memory 222. When an obstacle is in the field of view of such sensors, corrections to the localization of the apparatus 103 are implicitly applied to the obstacle (i.e. the stored position of the obstacle is updated along with the localization of the apparatus 103). However, when a previously detected obstacle is not currently within the field of view of the above sensor, such implicit updates to stored obstacle positions may no longer occur. As a result, the localization of the apparatus 103 may sometimes be corrected to overlap with the stored position of an obstacle that is not currently visible to the apparatus 103. Although no actual collision has occurred, such an event may generate an error condition, interrupt operation of the apparatus or the like. The method 400 to be discussed below mitigates or avoids the above virtual collisions resulting from corrections to the localization of the apparatus 103.

At block 305, the apparatus 103 is configured to initiate navigation and localization tracking. For example, the apparatus 103 can receive an instruction from the server 101 to travel to at least one location in the facility and/or perform tasks such as data capture at such locations. In response to the instruction, the apparatus 103 can generate a navigational path based on the facility map stored in the repository 232. The apparatus 103 can then initiate execution of the path by controlling the locomotive mechanism 203. The apparatus 103 also begins tracking localization, generating an updated localization estimate at any suitable frequency (e.g. 10 Hz, although a wide variety of other localization frequencies can also be employed both above and below 10 Hz).

The apparatus 103 can also be configured, for each localization, to generate a confidence level. The confidence level, which may also be referred to as localization certainty level, indicates the probable accuracy of the localization, as assessed by the apparatus 103. Various mechanisms for generating localizations and associated confidence levels will occur to those skilled in the art, including mechanisms based on any one or more of odometry data (e.g. received at the processor 220 from a wheel sensor or the like included in the locomotive mechanism 203), inertial sensor data (e.g. from an inertial measurement unit (IMU)), lidar data, or the like. The localization confidence level is typically generated simultaneously with the localization itself, and may be expressed in a variety of formats, including as a fraction between zero and one, as a percentage, or the like.

Before proceeding to block 410, the apparatus 103 is assumed to have computed at least one localization (that is, a current localization is assumed to be available). At block 410, the apparatus 103 determines whether any obstacles have been detected via the above-mentioned sensors at the current localization. A variety of object detection and/or recognition mechanisms can be employed by the apparatus 103 to process sensor data and determine whether the sensor data represents an obstacle distinct from the features of the facility map.

Figure 5:
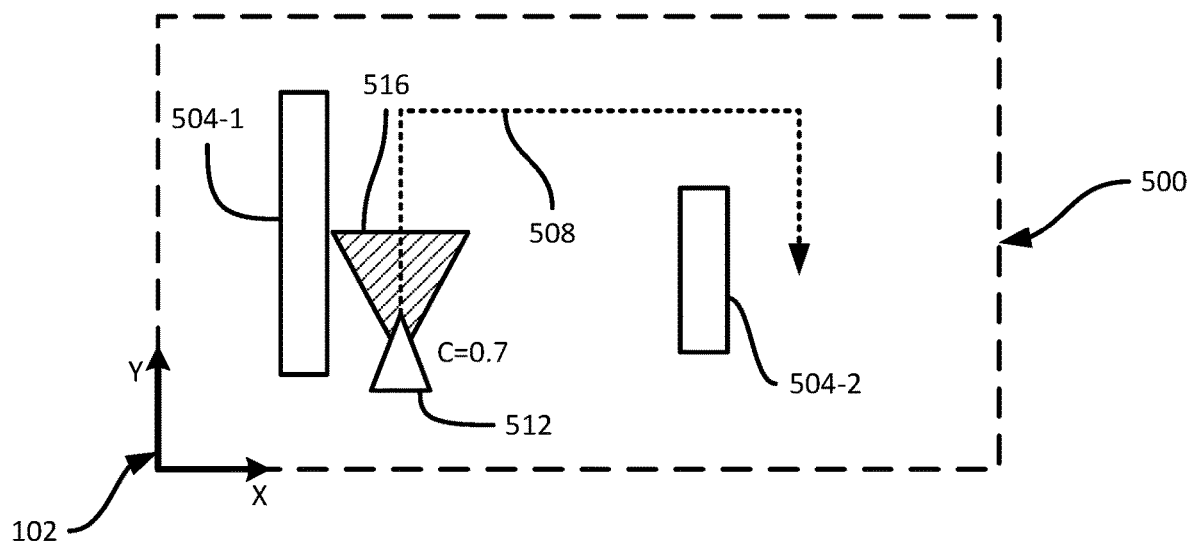
FIG. 5 is a diagram illustrating an example performance of block 405 of the method of FIG. 4.

Turning to FIG. 5, a map 500 is shown that contains indications, according to the frame of reference 102, of structural features of the facility such as shelf module boundaries 504-1 and 504-2. The map 500 also illustrates a navigational path 508 along which the apparatus 103 has begun to travel. Further, the map 500 illustrates a current localization 512 of the apparatus 104 as well as a confidence level associated with the localization 512. The confidence level is shown as 0.7 (e.g. within a range between zero and one, with one representing complete certainty). Also shown in the map 500 is a field of view 516 of the sensors 104 of the apparatus 103.

The map 500 need not be maintained in the memory 222 as a single file. Rather, the information shown in FIG. 5 can be maintained in multiple files in some embodiments. For example, the above-mentioned facility map can contain the boundaries 504, and the apparatus 103 can maintain a separate file defining the path 508 and localization 512. In addition, some information, such as the extent of the field of view 516, can simply be omitted (i.e. not stored explicitly in the memory 222).

As shown in FIG. 5, no obstacles are within the field of view 516, and the determination at block 410 is therefore negative. Returning to FIG. 4, the apparatus 103 therefore bypasses block 415 (to be discussed further below) and proceeds to block 420. At block 420 the apparatus 103 obtains an updated localization. As noted above, a variety of localization mechanisms can be employed by the apparatus 103, and the localization of the apparatus 103 can be updated at a variety of frequencies. For example, the apparatus 103 can capture respective sets of image and/or depth measurements, as well as odometry measurements, at a suitable frequency. Each set of measurements can be employed as inputs to a localization filter (e.g. a Kalman filter), which produces a localization estimate.

Figure 6:
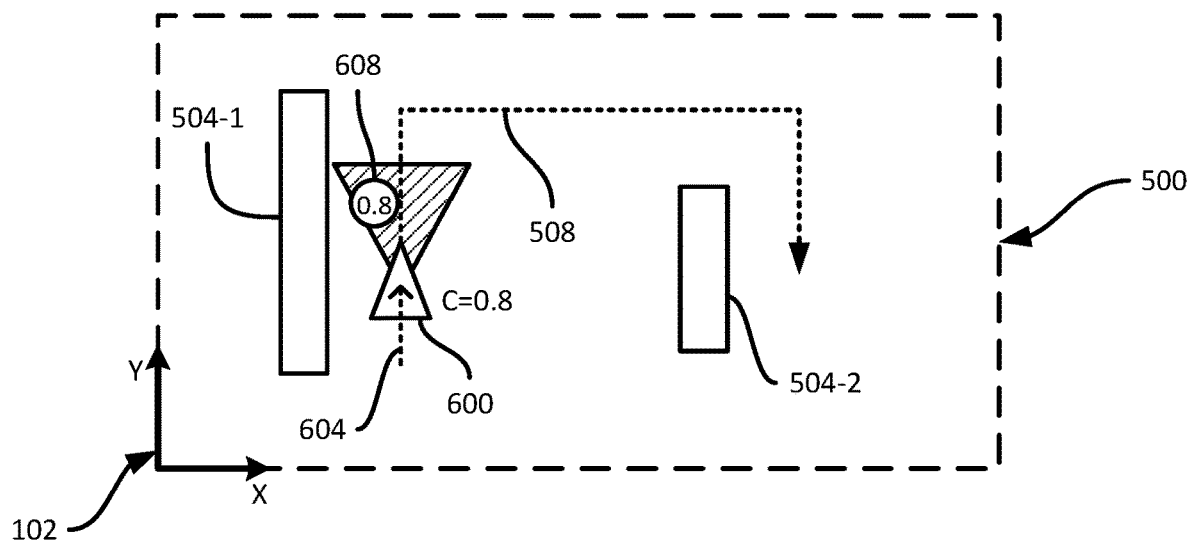
FIG. 6 is a diagram illustrating an example performance of blocks 420-425 and 405-415 of the method of FIG. 4.

At block 425, having obtained an updated localization, the apparatus 103 is configured to determine whether the updated localization obtained at block 420 represents a correction to a preceding localization (i.e. from block 405, or from the preceding performance of block 420 if applicable). Referring to FIG. 6, an updated localization 600 is shown, with a confidence level of 0.8. Relative to the localization 512 shown in FIG. 5, the localization 600 shows that the apparatus 103 perceives having traveled a certain distance along the path 508.

The determination at block 425 includes determining a difference between the updated localization from block 420 and a combination of the preceding localization and odometry data. In other words, when the preceding localization, modified by odometry data representing movement of the apparatus 103, is equal to the updated localization, no correction has occurred. However, when the preceding localization modified by odometry data representing movement of the apparatus 103 is not equal to the updated localization, a correction has occurred. In the example illustrated in FIG. 6, odometry data is indicated as a vector 604. In the illustrated example, the localization 512, modified by the vector 604, is equal to the localization 600. Therefore, the entirety of the difference between the localization 512 and the localization 600 is explained by the odometry data 604, and the determination at block 425 is negative. Performance of the method 400 therefore returns to block 410.

At a subsequent performance of block 410, still referring to FIG. 6, the determination at block 410 is affirmative. Specifically, an obstacle 608 is detected within the field of view 516 of the apparatus 103. The apparatus 103, in response to detecting the obstacle 608, proceeds to block 415. At block 415, the apparatus 103 stores an initial location of the obstacle 608 according to the frame of reference, based on the current localization 600 and the position of the obstacle 608 relative to the apparatus 103. The location of the obstacle 608 shown in FIG. 6 reflects the initial location of the obstacle 608 as stored in the memory 222. As will be apparent to those skilled in the art, the location of the obstacle 608 illustrated in FIG. 6 may not coincide exactly with the true physical location of the obstacle 608, due to error in the localization 600 of the apparatus 103.

In some examples, as illustrated in FIG. 6, the confidence level associated with the current localization 600 is also stored in association with the detected obstacle. Therefore, the location of the obstacle 608 is stored in conjunction with the confidence level "0.8".

Figure 7:
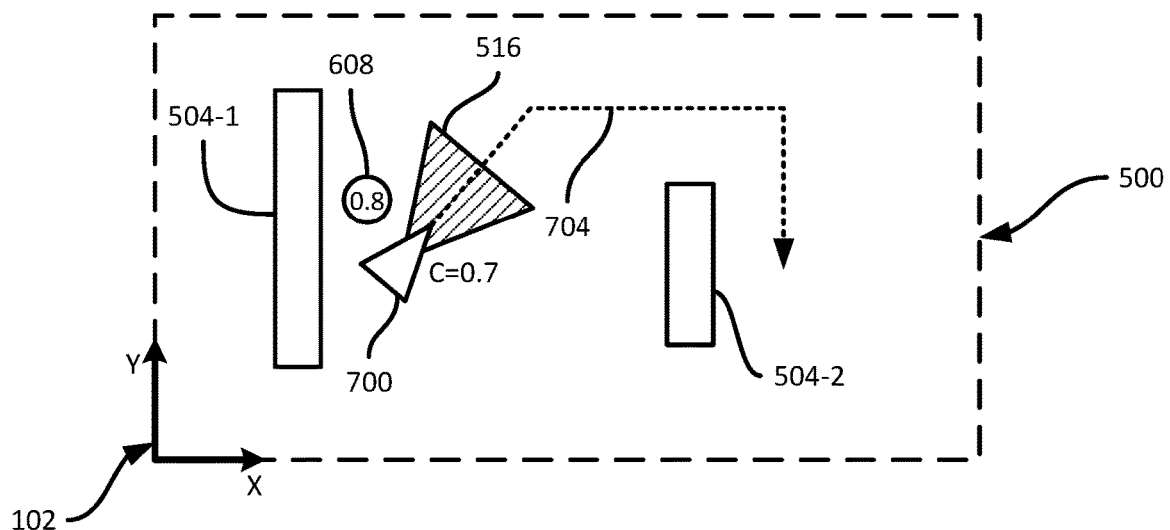
FIG. 7 is a diagram illustrating a further example performance of blocks 420-425 of the method of FIG. 4.

Having stored the obstacle location at block 415, the apparatus 103 proceeds to block 420 to obtain a further updated localization (e.g. in response to further travel along the path 508). In the present example, the apparatus 103 may also be configured to alter the path 508 to avoid a collision with the obstacle 608. Turning to FIG. 7, a further localization 700 (that is, obtained via another performance of block 420) is illustrated, with a confidence level of 0.7. As also shown in FIG. 7, the path 508 has been updated to a path 704, routing the apparatus 103 away from a collision course with the obstacle 608. It is assumed, for the current performance of block 425 (after the localization 700 is obtained), that the determination at block 425 is again negative. That is, the difference between the localization 700 and the localization 600 is assumed to correspond entirely to odometry data defining the motion of the apparatus along the path 704. Therefore, the apparatus returns to block 410.

At another performance of block 410, the determination is negative because, as seen in FIG. 7, no obstacles are within the field of view of the apparatus 103. The location of the obstacle 608 is retained, but the obstacle 608 is not currently visible to the apparatus 103 and may therefore be referred to as a historical obstacle that is stored in the memory 222.

Figure 8:
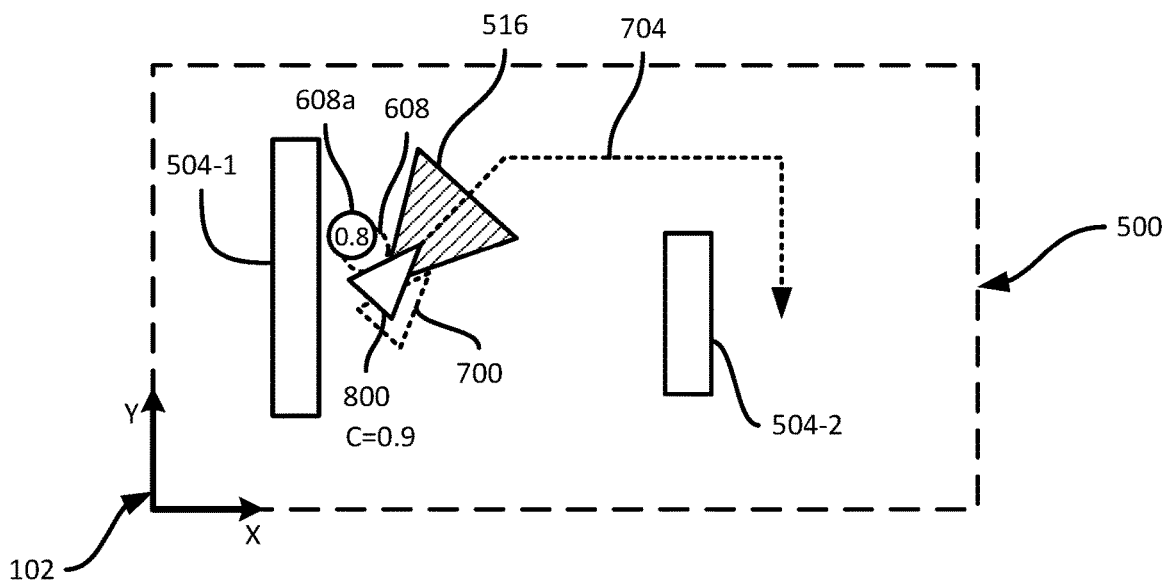
FIG. 8 is a diagram illustrating an example performance of block 430 of the method of FIG. 4.

The apparatus 103 therefore proceeds again to block 420 to obtain an updated localization, as illustrated in FIG. 8. In particular, FIG. 8 illustrates an updated localization 800, as well as the previous localization 700. It is assumed that the apparatus 103 has not moved between the acquisition of the localization 700 and the acquisition of the localization 800. In other words, the difference between the localizations 700 and 800 is not explained by odometry data, and therefore the determination at block 425 is affirmative. That is, the difference between the localizations 700 and 800 represents a correction to the localization of the apparatus 103.

The location of the obstacle 608 is also shown in FIG. 8 (in dashed lines). As will be apparent from the illustration, the obstacle 608 remains outside of the field of view 516, and the apparatus 103 is therefore unable to obtain updated information concerning the position of the obstacle 608 relative to the apparatus 103. Further, the stored location of the obstacle 608 overlaps with the updated localization 800. In the absence of any changes to the stored location of the obstacle 608, the apparatus 103 may perceive that a collision has occurred (when a collision has not, in fact, occurred), and may enter an error condition that prevents continued operation.

Referring again to FIG. 4, following an affirmative determination at block 425, the apparatus 103 proceeds to block 430. At block 430, to mitigate the occurrence of the above-mentioned virtual collision, the apparatus 103 applies an adjustment to the stored position of the obstacle 608. More generally, at block 430 the apparatus 103 applies an adjustment to a subset of stored obstacle positions. Which subset of stored obstacle locations is adjusted, and what adjustments are applied to the obstacle locations in that subset, may depend on a variety of factors as discussed below.

Returning to FIG. 8, in the illustrated example the apparatus 103 is configured to apply an adjustment to the location of the obstacle 608 that is equal to the correction applied to the localization (i.e. the difference between the localizations 700 and 800). That is, the stored location of the obstacle 608 is shifted, as shown by the stored position 608a, by the same distance and in the same direction as the localization 800 relative to the localization 700. The initial stored location of the obstacle 608 is discarded, and the confidence level associated with the updated obstacle location 608a may be retained.

In some examples, all stored historical obstacle locations can be updated as described above. That is, an adjustment equal to the localization correction can be applied to every historical obstacle location stored in the memory 222. Adjustments are not applied to obstacles that are within the field of view of the apparatus 103, because the stored locations of such visible obstacles are already based on the current localization, and they are not considered historical obstacles.

Figure 9:
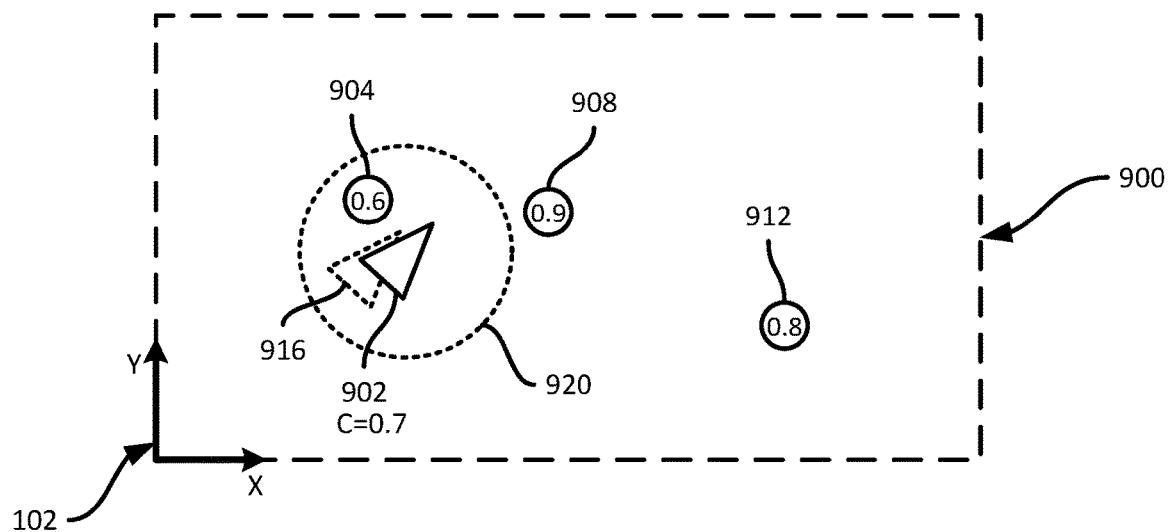
FIGS. 9 and 10 are diagrams illustrating another example performance of block 430 of the method of FIG. 4, employing a radius to select obstacle locations for adjustment.
Figure 10:
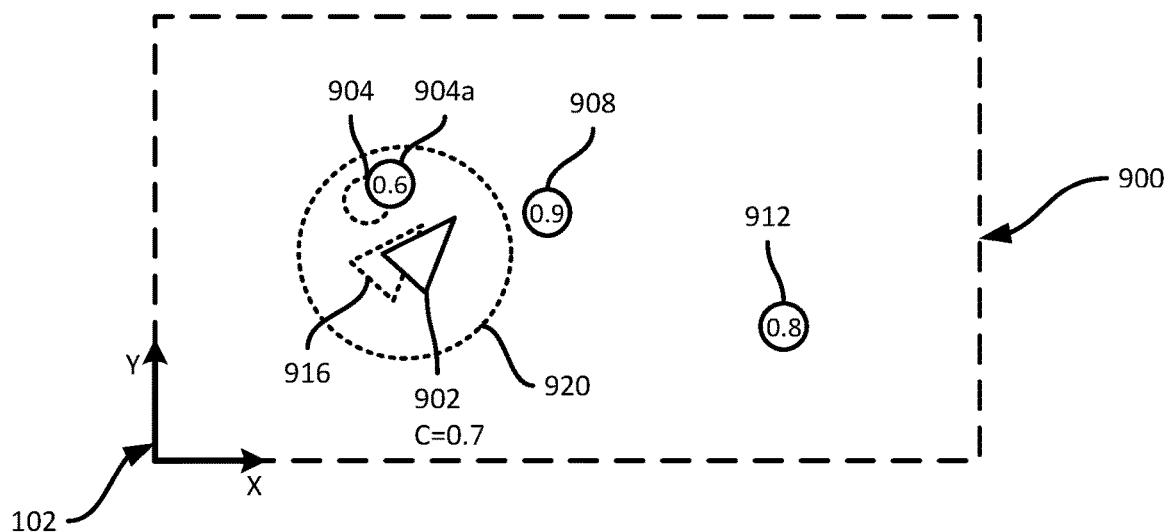

Turning to FIG. 9, another map 900 is illustrated showing an apparatus localization 902, as well as three historical obstacle positions 904, 908 and 912. A preceding localization 916 is also shown, to which the localization 902 represents a correction. In the illustrated example, the apparatus 103 is configured to apply the adjustment at block 430 only to stored obstacle positions within a predefined radius 920 from the current localization 902. Therefore, as shown in FIG. 10, following the performance of block 430, the obstacle location 904 has been updated to an obstacle location 904a, but the stored locations of the obstacles 908 and 912 are unchanged. That is, the adjustment applied at block 430 may be null for some obstacles.

Figure 11:
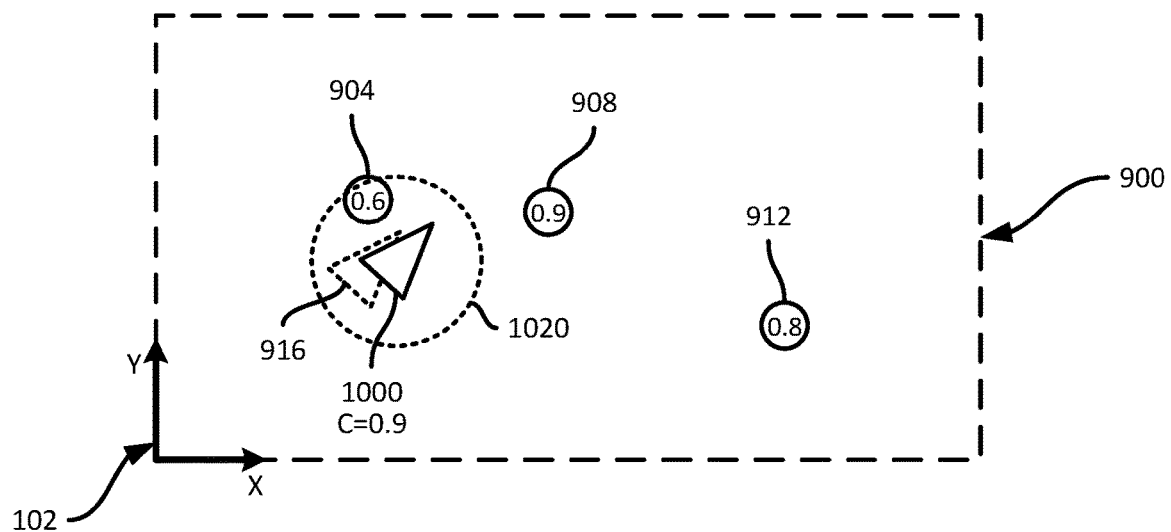
FIGS. 11 and 12 are diagrams illustrating another example performance of block 430 of the method of FIG. 4, varying the radius of FIGS. 9 and 10 based on localization confidence.
Figure 12:
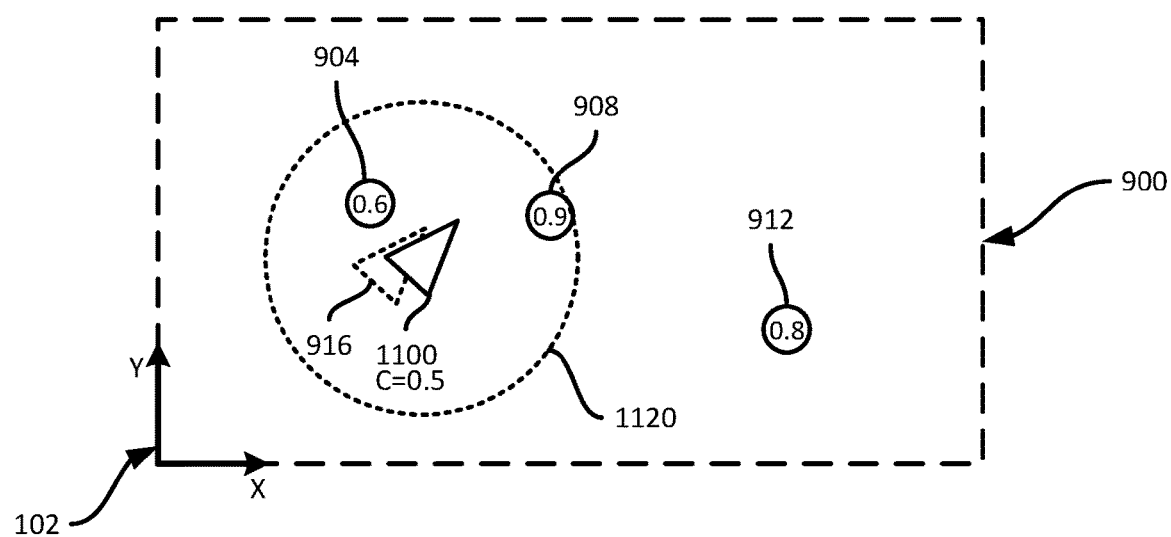

Turning to FIGS. 11 and 12, in other examples the radius 920 can vary depending on the confidence level associated with the current localization. In FIG. 11, a current localization 1000 has an associated confidence level of 0.9, compared to the confidence level of 0.7 shown in FIGS. 9 and 10. The apparatus 103 is configured to employ a smaller radius 1020 to select obstacles for adjustment. FIG. 12, in contrast, shows a localization 1100 with a confidence level of 0.5. The apparatus 103 therefore selects a larger radius 1120 to select obstacles for adjustment. The radius employed at block 430 can vary, for example, between a predefined minimum and a predefined maximum, with the variation being inversely proportional to the confidence level. For example, a confidence level of 1.0 (i.e. absolute certainty of localization) may lead to use of the minimum predefined radius, while a confidence level of zero may lead to use of the maximum predefined radius.

In other examples, rather than minimum and maximum radii, the apparatus 103 can store a default radius, which is incremented or decremented based on the confidence level associated with the current localization. More specifically, the radius may be decreased for each of a set of predefined steps above a confidence level of 0.5, or increased for each of a set of predefined steps below a confidence level of 0.5. Various other mechanisms for scaling the radius based on localization confidence level may also be employed.

Figure 13:
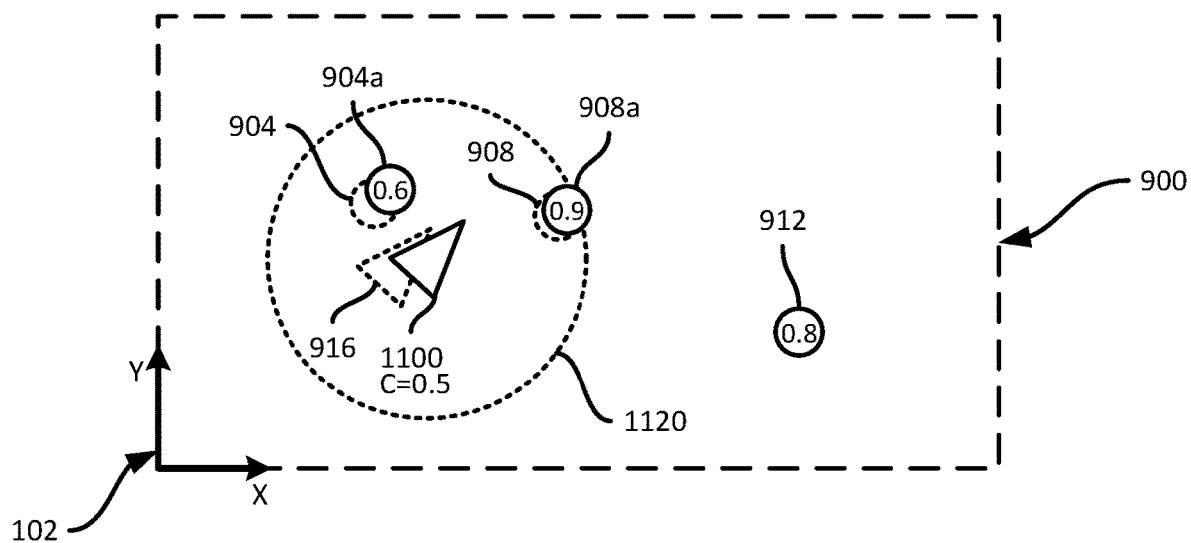
FIG. 13 is a diagram illustrating another example performance of block 430 of the method of FIG. 4, varying adjustments to obstacle locations based on distances between the obstacle locations and the apparatus localization.
Figure 14:
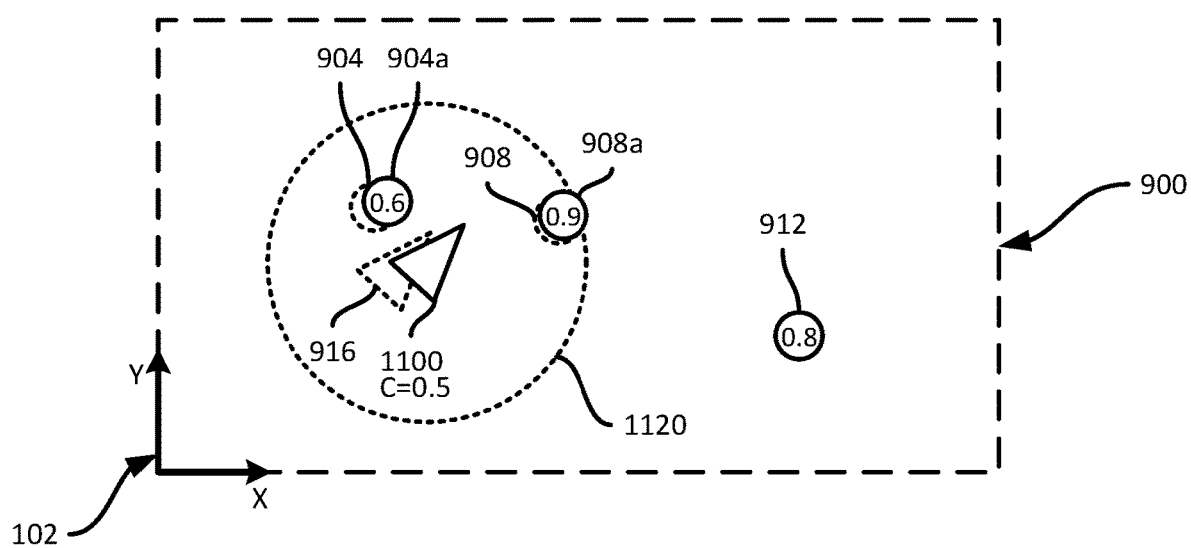
FIG. 14 is a diagram illustrating another example performance of block 430 of the method of FIG. 4, varying adjustments to obstacle locations based on confidence levels associated with the initial obstacle locations.

In further examples, as illustrated in FIGS. 13 and 14, the adjustment applied to each selected obstacle location is not equal to the localization correction, but varies with one or both of distance between the current localization and the stored obstacle location. In FIG. 13, adjustments are shown to the obstacle locations 904 and 908, resulting in updated obstacle locations 904a and 908a. The adjustments applied to the obstacle locations 904 and 908, however, are portions of the localization correction that are inversely proportional to the distance between the localization 1100 and the respective obstacle locations. The obstacle location 904, therefore, being closer to the localization 1100, is adjusted by a greater portion of the difference between the localizations 1100 and 916, whereas the obstacle location 908, being further from the localization 1100, is adjusted by a smaller portion of the above difference. The specific portions employed can be determined in various ways. For example, the entire localization correction can be employed for obstacles at zero distance from the apparatus 103, and a null adjustment (i.e. 0% of the localization correction) can be applied to obstacles at the radius 1120.

In FIG. 14, obstacle locations are adjusted based on confidence levels associated with the localizations at which the obstacles were detected. More specifically, obstacle locations are adjusted by portions of the localization correction that are inversely proportional to the confidence levels associated with the obstacle locations. Therefore, the obstacle location 908, with an associated confidence level of 0.9, may be adjusted by ten percent of the localization correction. The obstacle location 904, with an associated confidence level of 0.6, may be adjusted by forty percent of the localization correction.

Variations to the above systems and methods are contemplated. For example, in some embodiments the adjustments applied to obstacle locations can be portions of the localization correction based on the age of the stored obstacle locations. For example, at block 415 each detected obstacle location can be stored with a time of detection, and at block 430, obstacles with greater ages (i.e. earlier times of detection) may be adjusted by smaller portions of the localization correction.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of obstacle handling for a mobile automation apparatus, the method comprising:
   obtaining an initial localization of the mobile automation apparatus in a frame of reference;
   detecting an obstacle by one or more sensors disposed on the mobile automation apparatus;
   generating an initial location of the obstacle in the frame of reference, based on (i) the initial localization, and (ii) a detected position of the obstacle relative to the mobile automation apparatus;
   storing, in association with the initial location of the obstacle, a confidence level associated with the initial localization;
   obtaining a correction to the initial localization of the mobile automation apparatus;
   determining a positional adjustment to the initial position of the obstacle as a portion of the localization correction based on the confidence level, wherein the portion is inversely proportional to the confidence level; and
   applying the positional adjustment to generate an updated position of the obstacle.

2. The method of claim 1, wherein obtaining the correction to the initial localization includes:
   obtaining an updated localization of the mobile automation apparatus and odometry data; and
   determining a difference between (i) the updated localization and (ii) the initial localization modified by the odometry data.

3. The method of claim 2, further comprising:
   obtaining an adjustment radius; and
   determining a distance between the updated localization and the initial location of the obstacle;
   wherein the positional adjustment is null when the distance exceeds the adjustment radius.

4. The method of claim 3, further comprising: when the distance does not exceed the adjustment radius, generating the positional adjustment as a portion of the correction to the initial localization, the portion being inversely proportional to the distance.

5. The method of claim 3, further comprising: when the distance does not exceed the adjustment radius, generating the positional adjustment as equal to the correction to the initial localization.

6. The method of claim 3, wherein obtaining the adjustment radius includes:
   obtaining a confidence level associated with the updated localization; and
   increasing or decreasing a default adjustment radius according to the confidence level.

7. A mobile automation apparatus, comprising:
   a memory;
   at least one navigational sensor; and
   a navigational controller connected to the memory and the at least one navigational sensor, the navigational controller configured to:
      obtain an initial localization of the mobile automation apparatus in a frame of reference;
      detect an obstacle via the at least one navigational sensor;
      generate an initial location of the obstacle in the frame of reference, based on (i) the initial localization, and (ii) a detected position of the obstacle relative to the mobile automation apparatus;
      store, in association with the initial location of the obstacle, a confidence level associated with the initial localization;
      obtain a correction to the initial localization;
      determine a positional adjustment as a portion of the localization correction based on the confidence level, wherein the portion is inversely proportional to the confidence level; and
      apply the positional adjustment to generate an updated position of the obstacle.

8. The mobile automation apparatus of claim 7, wherein the navigational controller is configured, in order to obtain the correction to the initial localization, to:
   obtain an updated localization of the mobile automation apparatus and odometry data; and
   determine a difference between (i) the updated localization and (ii) the initial localization modified by the odometry data.

9. The mobile automation apparatus of claim 8, wherein the navigational controller is further configured to:
   obtain an adjustment radius; and
   determine a distance between the updated localization and the initial location of the obstacle;
   wherein the positional adjustment is null when the distance exceeds the adjustment radius.

10. The mobile automation apparatus of claim 9, wherein the navigational controller is further configured to: when the distance does not exceed the adjustment radius, generate the positional adjustment as a portion of the correction to the initial localization, the portion being inversely proportional to the distance.

11. The mobile automation apparatus of claim 9, wherein the navigational controller is further configured to: when the distance does not exceed the adjustment radius, generate the positional adjustment as equal to the correction to the initial localization.

12. The mobile automation apparatus of claim 9, wherein the navigational controller is further configured, in order to obtain the adjustment radius, to:
   obtain a confidence level associated with the updated localization; and
   increase or decrease a default adjustment radius according to the confidence level.

13. A non-transitory computer readable medium storing computer readable instructions for execution by a navigational controller, the instructions comprising:
   obtaining an initial localization of a mobile automation apparatus in a frame of reference;
   detecting an obstacle via at least one navigational sensor disposed on the mobile automation apparatus;
   generating an initial location of the obstacle in the frame of reference, based on (i) the initial localization, and (ii) a detected position of the obstacle relative to the mobile automation apparatus;
   storing, in association with the initial location of the obstacle, a confidence level associated with the initial localization;
   obtaining a correction to the initial localization;
   determining a positional adjustment to the initial position of the obstacle as a portion of the localization correction based on the confidence level, wherein the portion is inversely proportional to the confidence level; and applying the positional adjustment to generate an updated position of the obstacle.

14. The non-transitory computer readable medium of claim 13, wherein the instructions further comprise:
obtaining an updated localization of the mobile automation apparatus and odometry data; and
determining a difference between (i) the updated localization and (ii) the initial localization modified by the odometry data.

15. The non-transitory computer readable medium of claim 14, wherein the instructions further comprise obtaining an adjustment radius and determining a distance between the updated localization and the initial location of the obstacle, wherein the positional adjustment is null when the distance exceeds the adjustment radius.

16. The non-transitory computer readable medium of claim 15, wherein the instructions further comprise:
when the distance does not exceed the adjustment radius, generating the positional adjustment as a portion of the correction to the initial localization, the portion being inversely proportional to the distance.

* * * * *